United States Patent

[11] 3,557,298

[72] Inventors John T. Thompson
Tarzana (244 Loring St., Los Angeles, Calif. 90024);
George W. Gillemot, Venice, Calif. (2331 20th St., Santa Monica, Calif. 90405)
[21] Appl. No. 809,808
[22] Filed Mar. 24, 1969
[45] Patented Jan. 19, 1971

[54] REUSABLE MULTIPURPOSE PROTECTIVE ASSEMBLY FOR CABLE SPLICES
6 Claims, 8 Drawing Figs.

[52] U.S. Cl. .................................................. 174/10,
150/52, 174/21, 174/88, 174/138
[51] Int. Cl. .................................................. H02g 1/14
[50] Field of Search .......................................... 174/5, 10,
21, 22, 84, 92, 138, 138.4, 88; 138/147 (Cursory),
149 (Cursory), 168 (Cursory); 285/293; 150/52;
128/75, 76, 77, 80, 94, 165, 171, (Velcro Digest)

[56] References Cited
UNITED STATES PATENTS

| | | | |
|---|---|---|---|
| 2,930,835 | 3/1960 | Bollmeier | 174/92X |
| 3,054,400 | 9/1962 | Lizio | 128/(Velcro Digest) |
| 3,135,820 | 6/1964 | Hallett, Jr., et al. | 174/5 |
| 3,143,154 | 8/1964 | Best | 150/52 |
| 3,232,289 | 2/1966 | Zimmerman | 128/(Velcro Digest) |
| 3,419,669 | 12/1968 | Dienes | 174/84 |
| 3,427,392 | 2/1969 | Plummer | 174/138(.4)X |

FOREIGN PATENTS

| | | | |
|---|---|---|---|
| 1,263,391 | 5/1961 | France | 128/(Velcro Digest) |
| 406,410 | 3/1934 | Great Britain | 174/5 |

*Primary Examiner*—Laramie E. Askin
*Attorney*—Sellers and Brace

ABSTRACT: A reusable multipurpose protective jacket assembly for cable splices including a fluidtight resilient inner plaque and a larger nonstretchable restraining plaque each provided with means for holding the same wrapped about an incomplete splice. The inner stretchable rubber plaque is coated with tacky material readily sealable to the cable sheath and to its uncoated surface to provide a fluid-type bladderlike enclosure for the splice and which is then inflatable with gas from the gas charged cable to safeguard against entry of moisture. The outer plaque provides a restraining shroud to protect and prevent blowout of the rubber bladder. Additionally, the restraining shroud can be suspended between an open splice and a wet manhole wall to shield the splice from the wet wall while splicing is in progress.

INVENTORS
JOHN T. THOMPSON
BY GEORGE W. GILLEMOT

ATTORNEYS

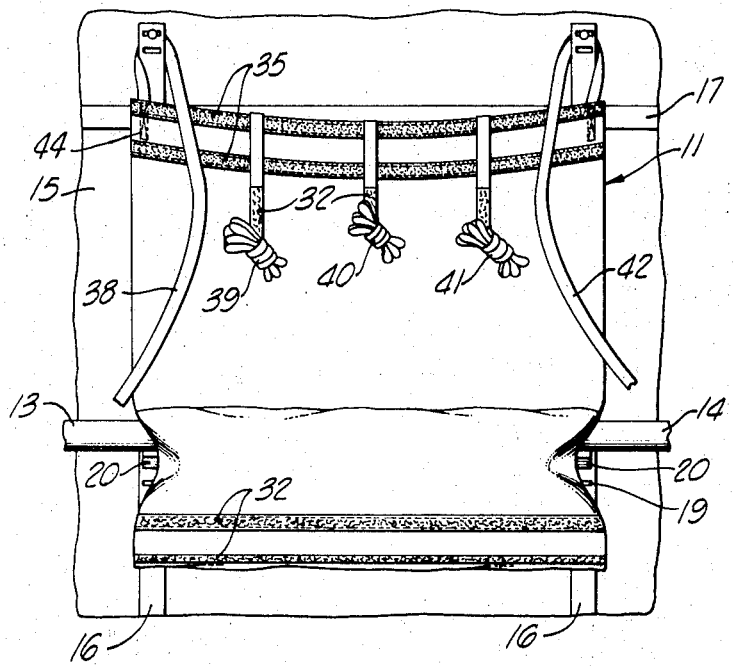
Fig. 6.
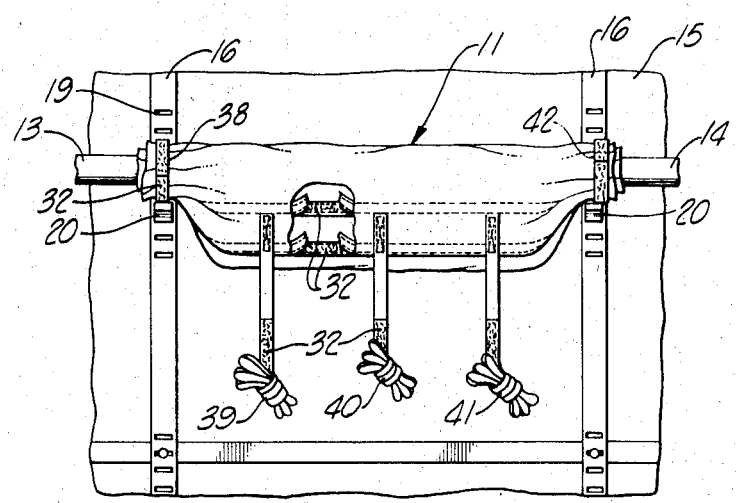
Fig. 7.
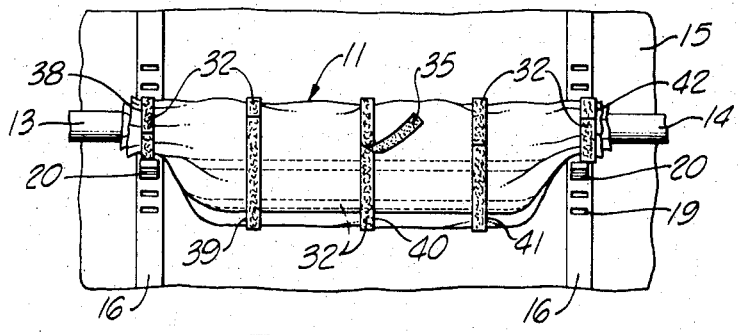
Fig. 8.
INVENTORS
JOHN T. THOMPSON
BY GEORGE W. GILLEMOT
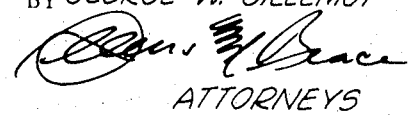
ATTORNEYS

REUSABLE MULTIPURPOSE PROTECTIVE ASSEMBLY FOR CABLE SPLICES

This invention relates to cable slice boots and, more particularly, to an improved reusable protective jacket assembly serving multiple purposes.

The processing of a cable splice and, more particularly, a telephone communication cable, is a very exacting operation beset by various hazards, chief among which is a safeguarding the cable against entry of the slightest moisture. Larger and more complex splice operations frequently cannot be completed in an uninterrupted splicing operation. Very considerable risk is therefore unavoidably incurred in leaving the splice unattended and exposed in any degree between splicing periods. Numerous proposals and expedients have been made heretofore in an a effort to provide the requisite protection and safeguards, but these are open to numerous objections and shortcomings sought to be avoided by the present invention. Desirably, the temporary boot or protection for the splice should include some provision for pressurizing the splice to a superatmospheric pressure with the objective to having any leak counter any attempt of water or other liquid to enter the enclosure. Assemblies heretofore proposed with intended provisions for meeting these requirements have been complex, costly, unreliable and extremely time-consuming to apply and remove between periods of active splicing.

The present invention proposes a compact, simple, inexpensive, easily manipulated and reusable two-part assembly for temporarily enclosing a splice. This protective assembly can be applied in a few minutes without need for tools of any kind and can be detached even more expeditiously. The outermost part of the two-part kit is preferably used as a suspended shield between the splice and any wet or dirty surface in the vicinity of the splice and remains in use for this purpose before again enshrouding the splice, or until the splice has been completed and check tested.

More specifically, the invention protective kit includes an inner rubber sheet coated at least along its perimeter with strongly adherent tacky material of the pressure-sensitive type. Between uses, this tacky coating is preferably protected with a non adhering easily detached protective sheet or film. When portions of this protective layer are removed, the exposed tacky material can be employed to form a separable fluidtight bond with the cable sheath or with the uncoated opposite surface of the rubber sheet thereby to enshroud the splice area with a gastight boot or bladder.

To protect this inner boot and avoid any possibility of its blowout, the boot itself is enshrouded with a restraining wrapper of high-strength impervious sheet material. The latter is detachably secured in place irrespective of the girth of the splice by touch-sensitive sets of interlocking fastener means, one-half of which comprises a row of closely spaced resilient barbs and the other half a row of loosely intertwined fibers. By providing a multiplicity of rows of such interlocking bars and fibers, the girth of the jacket may be varied widely to provide a snug-fitting jacket for a wide range of splice diameters. Supplementing these fastener means are a series of straps attached to one lateral edge of the restraining jacket and adapted to be wrapped about the jacket and so held by interlocking barbs and fibers of the same type referred to above and secured to the opposite sides of the individual straps. After the splice has been enshrouded by the described concentrically related inner and outer jackets, the gas charge, customarily present interiorly of at least one of the cables, bleeds into the jacket assembly and pressurizes the latter to a suitable superatmospheric pressure until such time as the splicers are ready to resume work. At that time the sets of fasteners are readily peeled apart following which the outer jacket is again suspended by its straps and utilized as a shield between any wet surface and the splice proper.

Accordingly, it is a primary object of the present invention to provide a unique reusable multipurpose temporary protective jacket assembly for cable splices.

Another object of the invention is the provision of a two-part jacket assembly for cable splices readily applied about and removed from incomplete cable splices without need for tools.

Another object of the invention is the provision of a reusable protective high-strength splice protector readily accommodating a wide range of splice sizes.

Another object of the invention is the provision of a water waterproof protective jacket for cable splices having a multiplicity of means for holding it assembled in a wide range of sizes and capable of withstanding safely the highest internal cable pressures encountered in normal service.

Another object of the invention is the provision of a multipurpose protective splice jacket selectively usable as a suspended shield between wet or dirty wall surfaces and the splice while the splice is in progress, and thereafter adapted to be quickly assembled about the splice as a shield and restraint for a pressurized bladder.

Another object of the invention is the provision of a two-part splice protector including a self-sealing expandable inner bladder and a quickly assembled and detached outer restraining jacket.

These and other more specific objects will appear upon reading the following specification and claims and upon considering in connection therewith the attached drawing to which they relate.

Referring now to the drawing in which a preferred embodiment of the invention is illustrated:

FIG. 6 is a view similar to FIG. 4, but showing the outer jacket being wrapped about an incomplete splice;

FIG. 7 is a view similar to FIG. 6, but showing the opposite ends of the outer jacket contracted against the cable sheath; and FIG. 8 is a further view showing the last strap in the process of being touch-pressed into assembled position.

Figure 1:
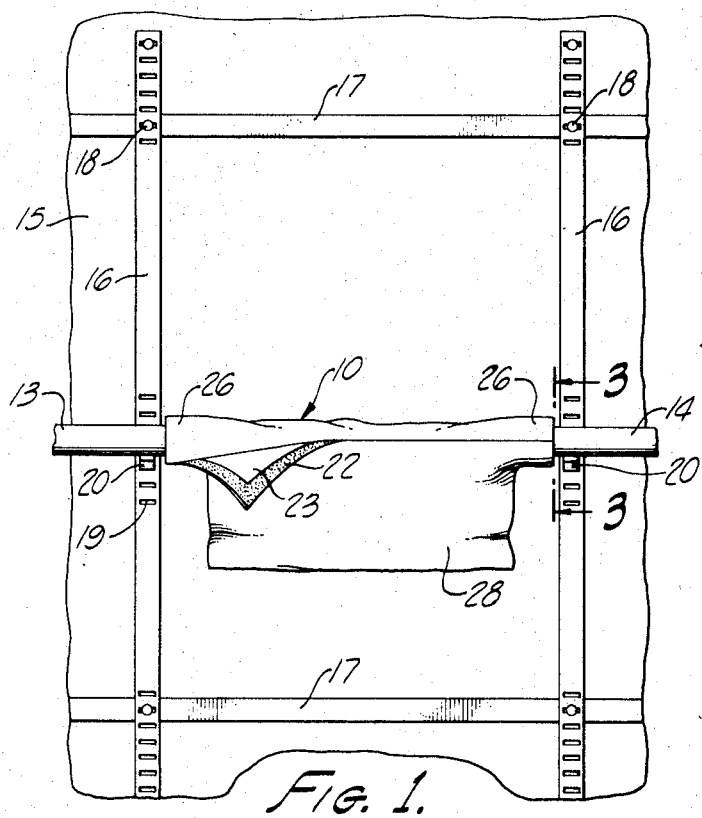
FIG. 1 is an elevational view showing an incomplete cable splice in the process of being enclosed by the invention inner moisture proof jacket.
Figure 2:
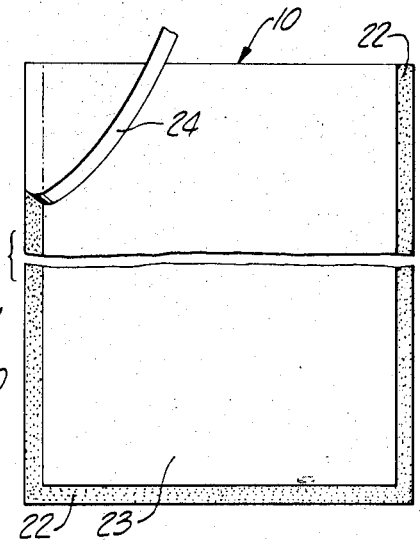
FIG. 2 is a plan view of the inner jacket showing a strip of the protective film for the tacky layer being removed.
Figure 3:
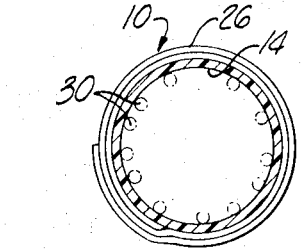
FIG. 3 is a cross-sectional view on an enlarged scale taken along line 3-3 on FIG. 1.

Referring more particularly to FIGS. 1 to 3, there is shown a preferred embodiment of the invention protective splice assembly comprising an inner plaque 10 of sheet elastomer and a substantially larger outer strong restraining jacket 11. A herein shown, both the inner and outer plaques or jackets 10 and 11 comprise rectangular sheets of similar proportions but with the outer restraining jacket 11 being somewhat larger. Outer jacket 11 is preferably formed of high-strength fabric, such as fiberglass or canvas, and is rendered impervious to gas and liquids, as by a suitable plastic or rubber coating. The widths of plaques 10 and 11 are substantially greater than the distance between the ends of the sheaths of two or more cables 13, 14. A herein shown for purposes of illustration, cables 13 and 14 are undergoing splicing in an underground manhole, one sidewall of which is indicated at 15. In accordance with customary practice, such walls are equipped with bracket strips 16, 16 secured to mounting strips 17, as by fasteners 18. Openings 19 at closely spaced intervals along strips 16 serve as anchorages for removable brackets 20. When not being service, cables 13 and 14 are normally shifted toward the support ends of brackets 20 but, when undergoing splicing, the cables are pulled outwardly away from the wall to provide freer access to the wires being spliced together.

It frequently happens that the sidewall of manholes or other supports for cabling are moist. Even if dry, proper procedure would dictate the use of outer jacket 11 as an outstretched protective shield between the wall and the splice proper. This is readily accomplished by suspending jacket 11 against the well in the manner best illustrated in FIG. 4.

The inner protective jacket 10 comprises a main body sheet of soft flexible rubber or the like coated on one surface, or at least along a substantial width of its perimeter, with a tacky coating 22 of a pressure sensitive adhesive well known in the tire inner tube patching art. This composition is strongly, but separably, adherent to cable sheath materials as well as the surface of rubber.

The tacky coating 22 is normally protected by a readily removable smooth surfaced film 23. This film may comprise thin coated fabric which tears readily along a straight line between adjacent threads, thereby facilitating the removal of a strip 24 of selected width. Usually such strips are removed only along the perimeter leaving the remainder of the tacky coating covered with film 23. Some users also prefer to tailor the perimeter of inner jacket 10 to provide projecting ends 26 of a length adequate to encircle the cable sheaths one or more times. The remainder of the jacket provides a dependent shallow sacklike portion 28 of a size adequate to enclose the wire ends being spliced together. A number of such wires awaiting splicing are indicated at 30, 30 in FIG. 4.

Figure 4:
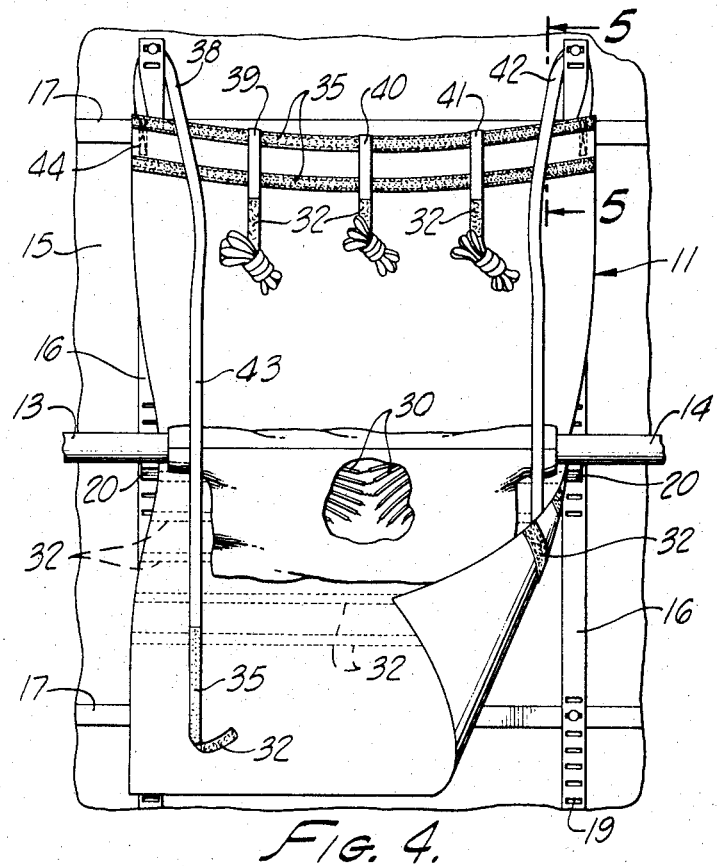
FIG. 4 is a view similar to FIG. 1 showing the inner jacket assembled about an incomplete splice and the outer jacket in use as a suspended protective shield.
Figure 5:
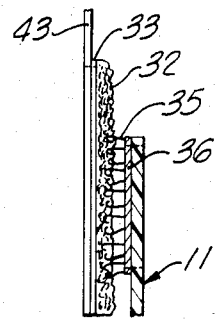
FIG. 5 is a cross-sectional view on an enlarged scale taken along line 5-5 on FIG. 4.

Referring now more particularly to FIGS. 4 and 5, the restraining jacket 11 will be understood having a substantial number of strips of intertwined fibers 32 bonded or otherwise secure in known manner to a backing strip 33, this assembly being stitched, bonded or other wise affixed crosswise of jacket 11. These strips of fibers 32 are of a type well known and available in the market place, these fibers being intertwined in such a way as to leave a multiplicity of voids into which a multiplicity of short flexible plastic barbs 35 readily penetrate and interlock with the fibers. Barbs 35 are fixed to mounting strips 36 and are secured in closely-spaced parallel rows crosswise of the other face of jacket 11. As herein shown, there are two rows of barbs 35 crosswise of the upper end portion of the jacket. The opposite or rear face of the jacket is provided with a multiplicity of rows of the fiber strips 32, the spacing between the rows corresponding to the spacing between the rows of barbed strips.

It will therefore be evident that when the rows of fibers and barbs are brought into juxtaposition, the two rows of barbs 35 are positioned to interlock with the adjacent pair of fiber strips. By varying the spacing between the rows of fibers and barbs, it is possible to provide for any increment of variation in the diameter of the jacket when wrapped about a cable splice. A spacing of 3 of 4 inches is found adequate for the customary cable splice situation, but obviously this spacing can be increased or decreased without departing from the spirit of the invention. As herein shown, all rows of barbs and fibers are shown parallel to the edges of the jacket, but it will be understood that this pattern may be varied and that the rows may converge or diverge, particularly near the opposite longer edges of the jacket if so desired.

For convenience in providing a high-strength assembly to withstand higher than usual cable gas charging pressures and in order to provide for constricting the opposite ends of jacket 11 about cables 13 and 14, jacket 11 is preferably provided with a multiplicity of long, lightweight, high-strength straps 38, 39, 40, 41 and 42. Each strap preferably includes a woven high-strength nylon tape 43 stitched or otherwise firmly secured to the jacket as indicated at 44. Substantially, the entire length of one face of each strap 43, includes a strip of fibers 32. The free ends of each strap also are provided on the surface opposite from fiber strips 32 with at least a short length of the barbed strips 35. An 18-inch length of barbs is found quite satisfactory, but it will be understood that the length of the barbed strip may be varied.

The mode of using the described splice cover assembly will be quite apparent from the foregoing description of the structural details. Normally, and at the beginning of a splicing operation, cables 13 and 14 are pulled outwardly from the wall 15 permitting outer jacket 11 to be suspended using any convenient pair of straps, as straps 38 and 42, to support the jacket. These straps are looped over the upper ends of bracket mounting strips 16, 16 and the fiber strips 32 on the straps are then pressed against the two rows of barbs 35. This firmly anchors the straps and the jacket in suspension thereby providing a clean and watertight shield for the splicing operation. The splicers proceed to join the wires together in the customary manner. Before ending the particular work shift, the unfinished splice is securely wrapped by placing the inner rubber plaque 10 about the splice in the manner illustrated in FIGS. 1, 2 and 4. Portions 26, 26 of the plaque are wrapped tightly about the adjacent surface of the cable sheath and pressed into contact therewith to assure an airtight junction. The transverse lateral edge of the plaque is likewise pressed against the outer surface of the plaque in the manner made clear in FIG. 1 and providing an airtight boot enclosing all portions of the splice junction. The pressurized dry gas present in the cable gradually seeps into the bladderlike boot provided by jacket 10 until the pressure equalizes at some value above atmospheric pressure.

While the inner jacket is filling with gas, the outer restraining jacket 11 is wrapped helically thereabout. This operation is carried out in such manner that the rows of barbs 35 lay directly opposite the two closest rows of fibers 32 and are pressed into interlock therewith. This having been done, the operator proceeds to secure the assembly snugly in place by wrapping each of the straps 38, 39, 40, 41, 42 in turn about the assembly. Usually, the two end straps, 38 and 42 are secured in place first, each of the straps being wrapped helically, one convolution on top of another for the full length of each and then instantly locked in place by pressing its barbs into the underlying fibers. The intermediate ones of the straps are similarly secured in place, the finished assembly having the general appearance shown in FIG. 8.

The described assembly has been found to withstand internal gas pressures as high as 25 p.s.i. and providing complete assurance against the possiblity of moisture or any foreign material penetrating into the splice.

Removal of both jacket assemblies and resumption of the splicing operation is accomplished within a very few minutes. The operator merely grasps the net of each strap net peels it from the fibers and returns the outer jacket 11 to its initial suspended position as shown in FIG. 4. The inner jacket 10 is removed equally expeditiously by peeling the tacky layer away from the uncoated surface. The exposed tacky material may then be protected folding the exposed surfaces against one another and placing the blanket in a safe place until again ready for use. After a further period of splicing, the incomplete splice is again restored to its fully protected condition by repeating the operations described above. Both the inner and outer jackets may be reused repeatedly without decrease in effectiveness or reliability of either.

While the particular Reusable Multipurpose Protective Assembly for Cable Splices herein shown and disclosed in detail is fully capable of attaining the object and providing the advantages hereinbefore stated, it is to be understood that it is merely illustrative of the presently preferred embodiments of the invention and that no limitations are intended to the detail of construction or design herein shown other than as defined in the appended claims.

I claim:

1. In combination with a plurality a sheathed multiconductor cables having a short length of each unsheathed to expose conductors undergoing splicing and in need of protection from the elements, moisture and the like between periods of active splicing, an improvement comprising: a resilient cable splice bladder wrapped about the cable splice and sealed closed about the respective cable sheaths to either side of the conductors undergoing splicing and charged with pressurized gas, a protective jacket wrapped about said pressurized bladder and restraining the latter against excessive inflation and risk of rupture, said jacket comprising a high-strength sheet material having a length substantially in excess of the length of said cable splice and a width adequate to encircle the splice and said bladder in excess of one time, said jacket having rows of mutually interlocking barbs and loosely intertwined fibers secured to the opposite sides thereof interlocked and engaged with jacket wrapped about said cable splice, and a plurality of long high-strength straps having one end of each secured to said jacket and wrapped snugly about said cable splice enshrouded by said inflated bladder and said protective jacket and including means securing said straps in place under hoop tension at closely spaced intervals axially of said splice.

2. The combination defined in claim 1 characterized in that said straps have one end thereof secured to said plaque at spaced intervals along one edge portion thereof, and said straps have strips of mutually cooperating barbs and intertwined fibers secured to the opposite sides thereof and selectively interlockable with one another in various overlapped positions as said barbs are pressed into said intertwined fibers, and said straps being effective to hold said plaque of sheet material tightly wrapped about the cable splice until such time as the free ends of said straps are peeled apart in a manner to separate said interlocked barbs and fibers.

3. The combination defined in claim 1 characterized in that said plaque of sheet material comprises high-strength woven material coated with impervious material to render the plaque fluidtight.

4. In combination with pressurized sheathed cables in the process of having conductors thereof spliced together, a reusable pressurizable cable splice assembly for temporary use between periods of cable splicing, said splice assembly comprising an elastomeric shroud plaque coated along at least the perimeter portions of one side thereof with strongly adherent tacky material forming a separable fluidtight seal with another surface as the tacky material is pressed into firm contact with juxtaposed tacky material and effective to hold said shroud plaque wrapped about said cable sheating with one lateral edge of said plaque sealed against the uncoated side thereof after being wrapped to enshroud said cable splice, a protective restraining jacket assembled about said elastomeric plaque comprising high-strength impervious sheet material longer than the splice to be protected, said sheet material being helically wrapped snugly about said shroud plaque and including a plurality of straps having one end of each attached to an edge thereof, said straps including readily interlocking barbs and intertwined fibers respectively secured to the opposite sides thereof and interlocked as the free ends of the straps are wrapped helically about the jacket in overlapping convolutions, and said straps and the interlocked sets of barbs and intertwined fibers cooperating to form a strong restraining jacket encircling and effective to prevent blowout of said elastomeric shroud by the internal cable pressure.

5. The combination in claim 4 characterized in that said protective restraining jacket comprises a flat sheet of impervious material formed with a multiplicity of spaced apart rows of said intertwined fibers secured to one side thereof and at least one row of barbs generally parallel to said rows of fibers on the opposite side thereof and mateable with any selected row of said fibers, said flat sheet being suspendable generally vertically opposite one lateral side of a cable splice while the same is being worked upon to shield the splice from a moist wall, manhole sidewall or the like, and said straps being adapted for use in suspending said sheet between a source of moisture and a cable splice undergoing splicing.

6. A multiple purpose cable splice protective jacket comprising a four-sided sheet of high-strength impervious flexible sheet material having a plurality of tie-straps distributed along one edge thereof at closely spaced intervals and sufficiently long to embrace the jacket more than once when the jacket is wrapped about a cable splice, said straps having a long row of intertwined fibers secured to the major length of one side thereof and a multiplicity of closely spaced barbs secured to at least the free end portion thereof and which barbs interlock with said fibers when pressed together, said sheet material having a plurality of rows of intertwined fibers secured to one face thereof and extending in a direction generally parallel to but remote from the edge to which said straps are attached, a plurality of rows of barbs spaced apart similarly to the spacing between said rows of fibers and sized to interlock with said fibers when said barbs are pressed against said fibers, and said jacket being selectively usable while suspended by said straps alongside a cable splice to protect the latter from a closely spaced wet manhole wall and thereafter being snugly wrappable about a cable splice to enshroud the same and being so held by said multiplicity of straps and interlocked ones of said barbs and fibers to shield the splice from moisture.